United States Patent
Stoltz

(10) Patent No.: US 10,731,732 B2
(45) Date of Patent: Aug. 4, 2020

(54) AUTOMATIC POOL CLEANER GEAR MECHANISM

(71) Applicant: NC BRANDS L.P., Norwalk, CT (US)

(72) Inventor: Herman Stoltz, Port Elizabeth (ZA)

(73) Assignee: NC Brands L.P., Norwalk, CT (US)

( * ) Notice: Subject to any disclaimer, the term of this patent is extended or adjusted under 35 U.S.C. 154(b) by 293 days.

(21) Appl. No.: 15/326,489

(22) PCT Filed: Aug. 5, 2015

(86) PCT No.: PCT/IB2015/055949
§ 371 (c)(1),
(2) Date: Jan. 15, 2017

(87) PCT Pub. No.: WO2016/020862
PCT Pub. Date: Feb. 11, 2016

(65) Prior Publication Data
US 2018/0172114 A1    Jun. 21, 2018

(30) Foreign Application Priority Data

Aug. 5, 2014    (ZA) ................. 2014/05772

(51) Int. Cl.
| E04H 4/16 | (2006.01) |
| F16H 3/34 | (2006.01) |
| F16H 3/40 | (2006.01) |
| F16H 63/30 | (2006.01) |
| F16H 3/06 | (2006.01) |

(52) U.S. Cl.
CPC ............. *F16H 3/40* (2013.01); *E04H 4/1636* (2013.01); *E04H 4/1654* (2013.01); *F16H 3/06* (2013.01); *F16H 3/34* (2013.01); *F16H 63/302* (2013.01); *F16H 2312/09* (2013.01)

(58) Field of Classification Search
CPC ............... A47L 11/4063; E04H 4/1654; F16H 2312/09; F16H 3/06; F16H 3/34; F16H 3/40; F16H 3/302; Y10T 74/19372; Y10T 74/19605
USPC .......................................................... 72/354
See application file for complete search history.

(56) References Cited

U.S. PATENT DOCUMENTS

| 2,923,954 | A | * | 2/1960 | Babcock | ............... | A47L 7/0009 15/1.7 |
| 5,001,800 | A | * | 3/1991 | Parenti | .................. | E04H 4/1654 15/1.7 |
| 5,197,158 | A | * | 3/1993 | Moini | .................... | E04H 4/1654 15/1.7 |
| 6,094,764 | A | * | 8/2000 | Veloskey | ............... | E04H 4/1654 15/1.7 |
| 8,117,704 | B2 | * | 2/2012 | Schneider | ............. | E04H 4/1654 15/1.7 |
| 8,474,081 | B2 | * | 7/2013 | Stoltz | .................... | E04H 4/1654 15/1.7 |
| 2009/0307854 | A1 | * | 12/2009 | Garti | ..................... | E04H 4/1654 15/1.7 |
| 2012/0174326 | A1 | * | 7/2012 | Finezilber | ............. | E04H 4/1654 15/1.7 |

(Continued)

*Primary Examiner* — Joseph J Hail
*Assistant Examiner* — Arman Milanian
(74) *Attorney, Agent, or Firm* — Merchant & Gould P.C.; Daniel R. Evans

(57) ABSTRACT

A gear change and gear change biasing mechanism for use in an automatic swimming pool cleaner.

9 Claims, 8 Drawing Sheets

(56) References Cited

U.S. PATENT DOCUMENTS

2012/0210527 A1\* 8/2012 Erlich .................. E04H 4/1654
15/1.7

\* cited by examiner

FIG6
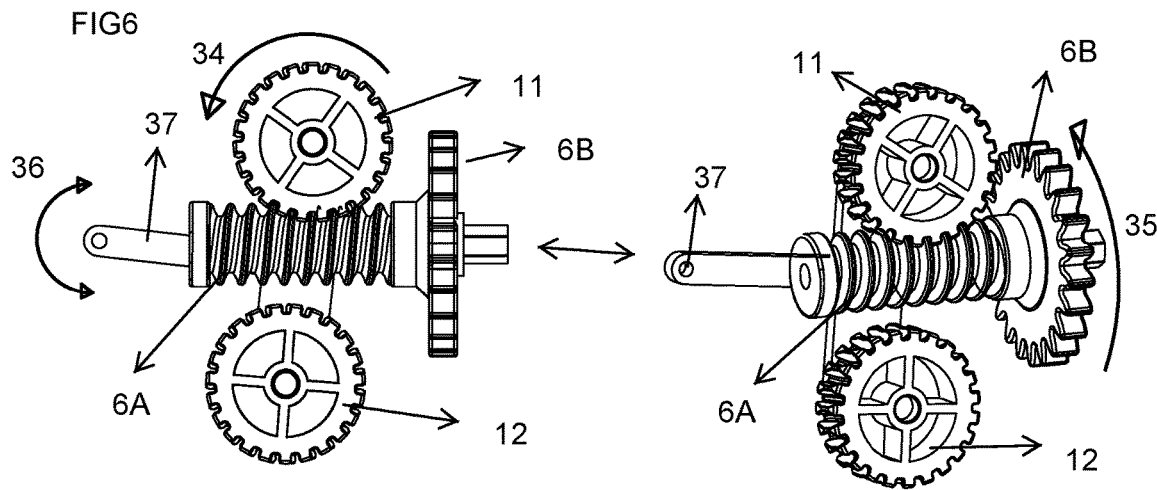
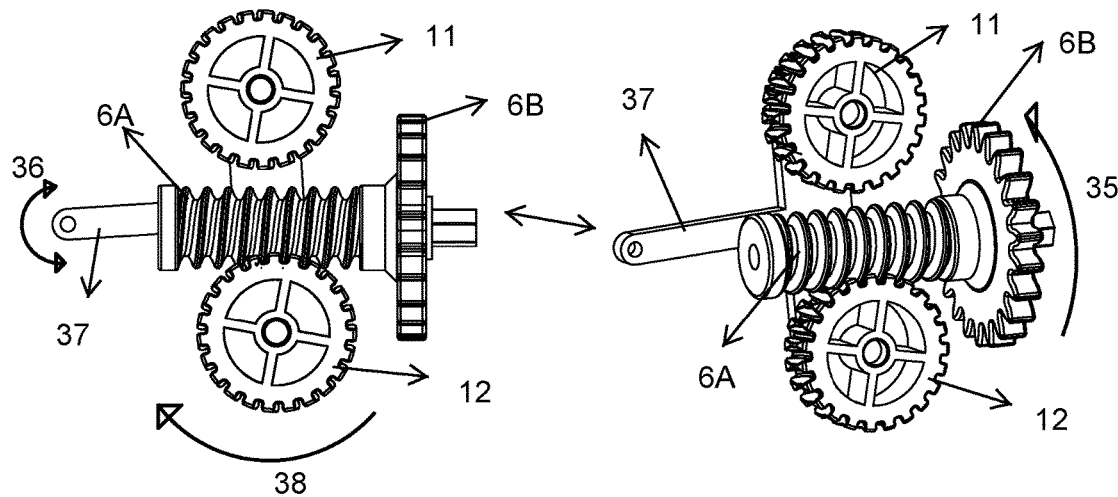
FIG7
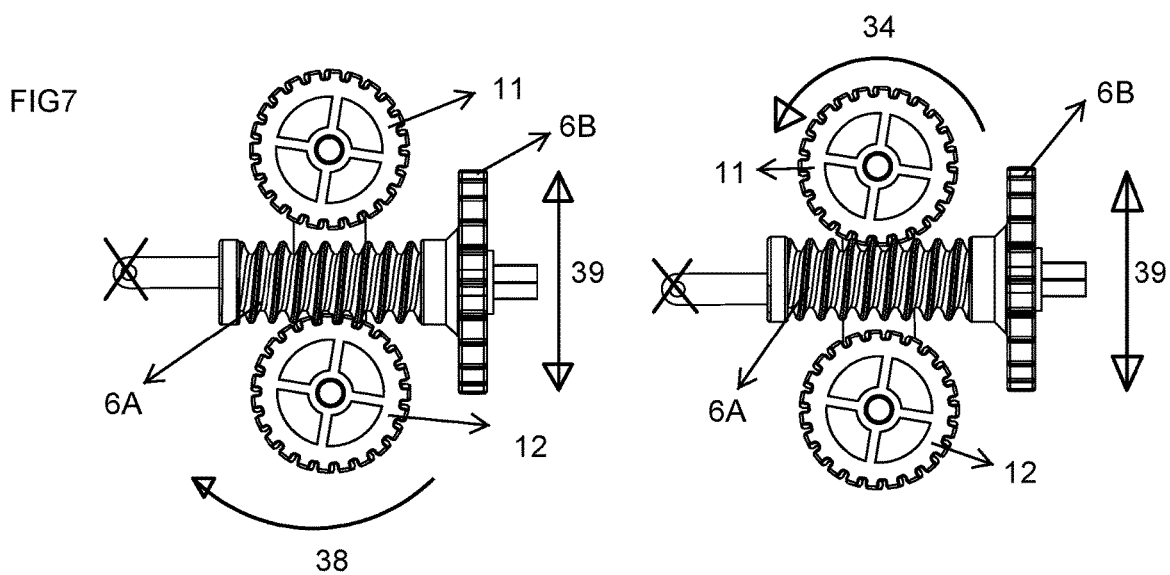

FIG 10
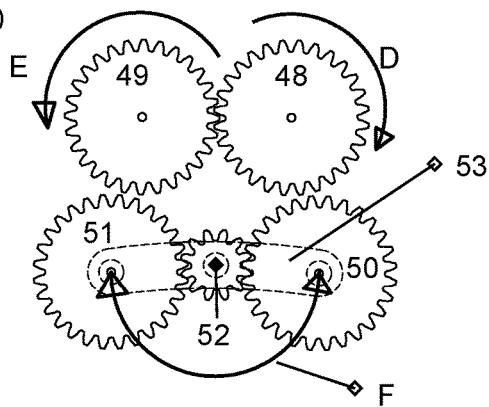
FIG 10.1
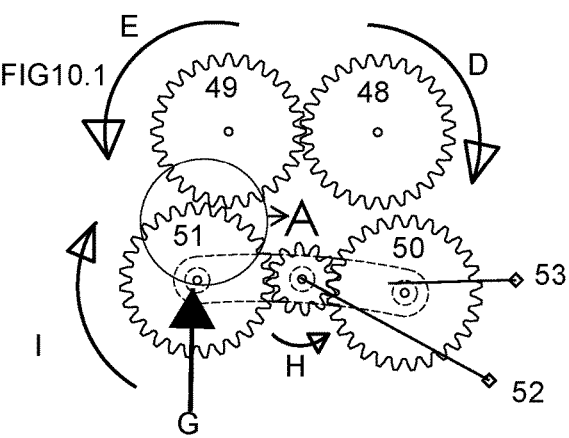
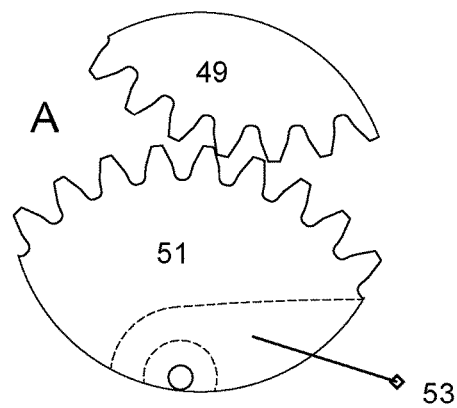
FIG 10.2
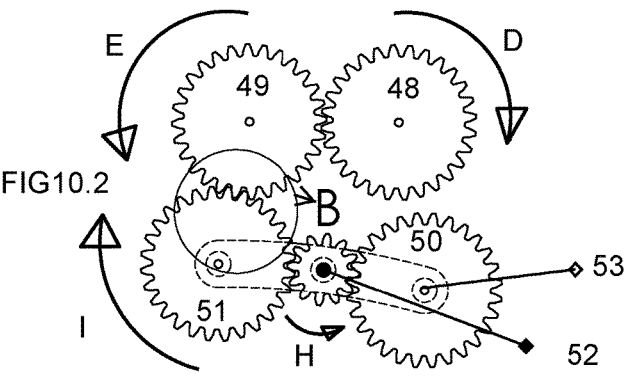
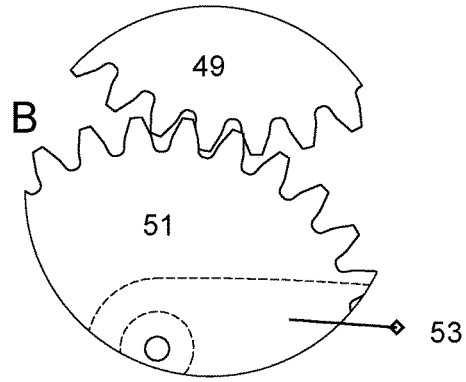
FIG 10.3
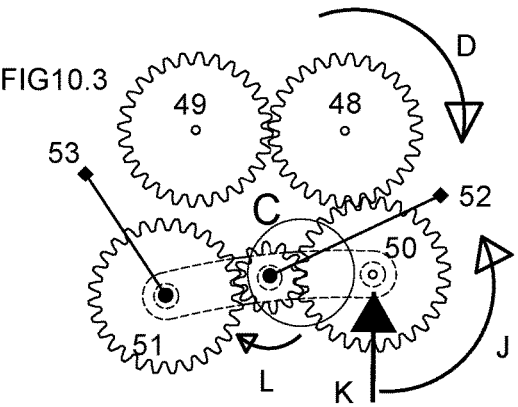
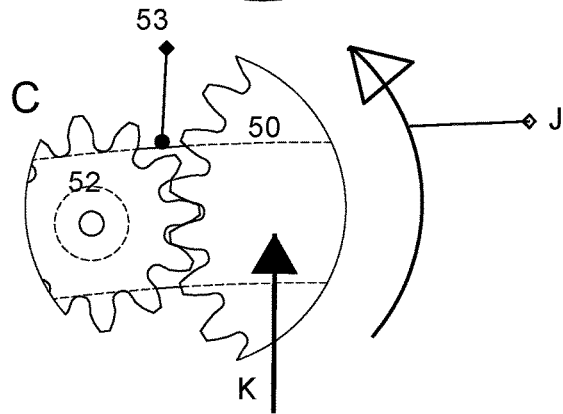

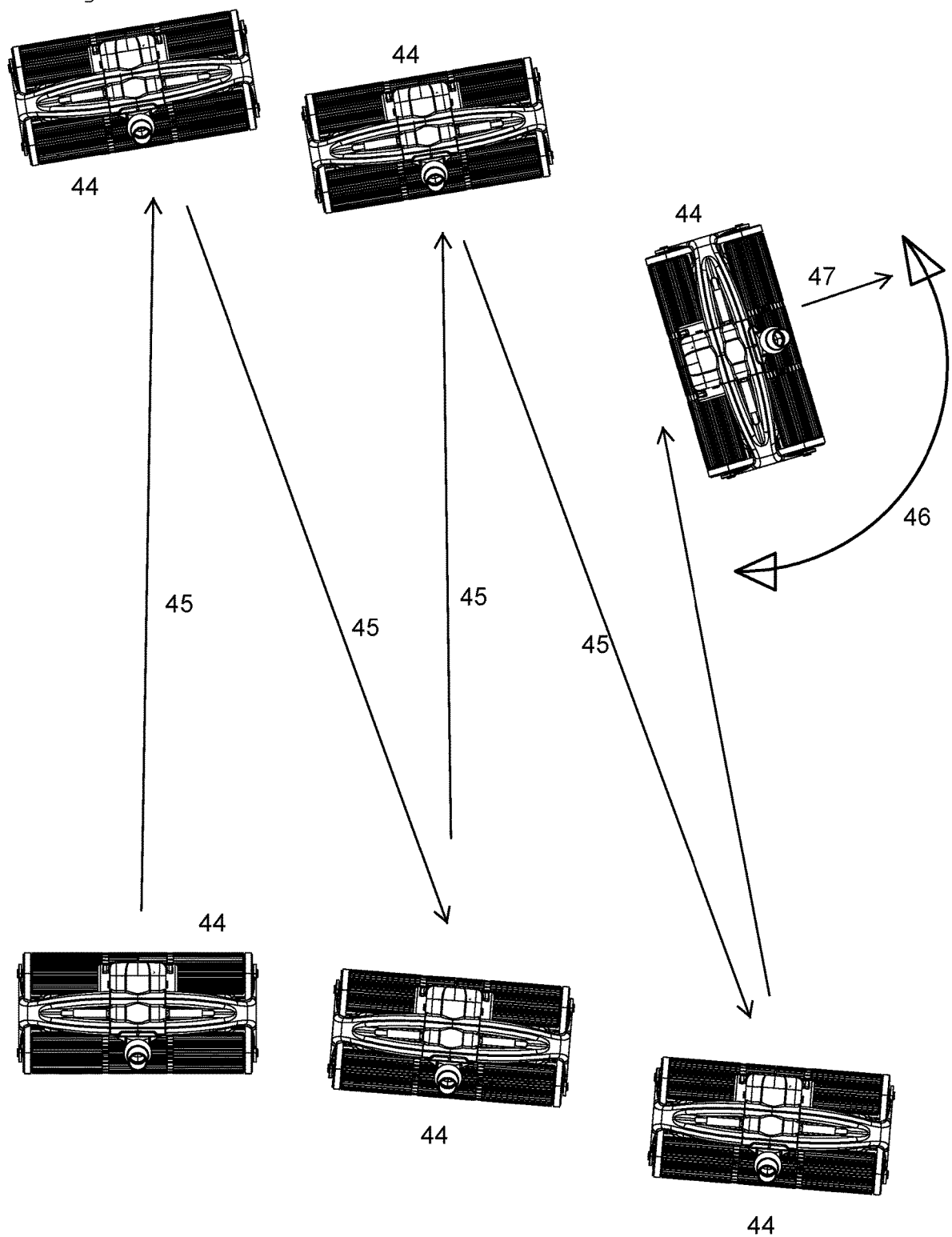

AUTOMATIC POOL CLEANER GEAR MECHANISM

TECHNICAL FIELD

This invention relates to suction type swimming pool cleaners and more specifically to turbine type swimming pool cleaners such as described in my patents. US 2012/0060307 A1, U.S. Pat. No. 7,464,429, US 20040211450

BACKGROUND ART

When drive is transmitted to a set of rollers, wheels and or endless tracks with formations inside track to cooperate with teeth on a drive wheel or pulley, similar to as described in my earlier U.S. Pat. No. 7,464,429 and US 20040211450, this is typically done through various means of couplings or gears to drive either pulleys, belts and or tracks. There are various means of steering a track driven cleaner such as to provide braking force to one side, gear change mechanisms or flow diversion versions of which are described in my earlier U.S. Pat. No. 7,464,429, US 20040211450, US 2012/0060307 A1.

Common procedure to provide input to either side of track is to have an arrangement of pulleys or drive wheels where typical one pulley may be a toothed drive pulley where the teeth may coincide with formations on the inside of a track or belt that will in turn provide drive to other rollers or pulleys. A common occurrence if the track is in contact with pool surfaces may be that track can slide off the pulley especially when direction changes occur. Typically some form of rigid self-centering rib or otherwise may prevent such an occurrence, the addition of these rigid ribs in turn create high resistance hence higher power demand. Wear on tracks are also significant as the tracks are in constant contact with the pool surfaces and especially when steering changes occur the friction will accelerate wear significantly. Such track mechanisms are described in my earlier patents; also examples thereof such as shown in pat US 2011/0314617A1, where in conjunction with an endless track a method for direction change incorporates a similar method as described in my earlier U.S. Pat. No. 7,464,429 where 2 bevel gears are positioned at right angles to a third bevel gear and whereby alternating engagement, by means of a cam operated oscillatable assembly, from one bevel to the other will reverse direction of the cleaner.

US 2011/0314617A1 describes a version where an axially moveable output drive pulley changes position within the track every time a change of direction occurs. U.S. Pat. No. 7,464,429 describes a version where an oscillatable assembly will operate as a separate function to the track in terms the output or drive pulley stays in a fixed position within the track. A Problem with the arrangement of moving between bevel gears and normal gears are that as a function of the gear type there will be a transitional period where the gears are not engaged, typically then gear wear will be accelerated during the engagement and disengagement process, wear rate will depend on friction within the drivetrain as well as the speed of transition from one gear engagement to the other and vice versa. In my earlier U.S. Pat. No. 7,464,429 one method to assist with a quick transition is described. An alternative version of reversing and steering a cleaner by providing independent forward or reverse rotation to 2 output shafts either side of a cleaner by flow diversion as a means to overcome the gear wear issue is shown in my patent US 2012/0060307 A1.

Whereas the means for utilizing an oscillatable assembly to engage one of 2 gears is therefore not new, the method for doing so in a manner as described in this invention will overcome inherent wear problems by a significant factor in terms of the duration of the engagement process as well as the type of gear mechanism more suitable for engage and disengagement of gears coupled with a low friction drivetrain.

OBJECT OF THE INVENTION

The aim of this invention is to provide a more reliable alternative as well as performance improvements and enhanced reliability to my earlier inventions as well as current configurations, including lower power demand with negligible wear on track and other components and an improved gear-change mechanism. Furthermore to allow a standalone modular drive or power module unit to be positioned on any type of arrangement whether be tracks, rollers or varying width of pool cleaner.

As a means for changing gears within a power module for this invention an arrangement of worm and worm gears within an oscillatable gear carrying assembly is the preferred device for changing direction in a seamless way, apart from the obvious benefits of engaging and disengaging a stationary gear to a driven worm type gear it also has the benefit that it is self-cleaning by forcing debris out of the meshed gear due to the nature of its design. Since the worm type gear assembly is immersed in water both cooling and lubrication is sufficient for this type of mechanism. Furthermore by introducing a specific arrangement of gear positioning and rotation within an oscillatable gear carrying assembly a quick and swift seamless gear change with a positive biased engagement feature is achieved without need of external devices such as springs, magnets etc.

SUMMARY OF THE INVENTION

For this invention an arrangement of rollers are positioned at one end of a platform. The rollers are split in the middle so that each roller is free to turn individually of the other. To provide drive to the rollers 2 gears are positioned circumferentially in line with each roller in such a way as to form a coupling with each roller. Each gear when coupled to the roller can rotate irrespective of the other gear. In the preferred embodiment the gears are positioned close to the center or mid position of the 2 rollers in such a way as to engage with an output gear on a turbine driven power module. Typically the outside diameter of the gears on the roller will be slightly less than the circumference of the roller to minimize wear on gear due to surface contact. The gears can be over-molded onto the roller or made from a flexible material to further minimize wear as well as to allow debris to proceed through the meshed portion when this gear is coupled to another gear. A flexible arrangement between chassis and drive module will have a similar effect.

The turbine drivetrain module has integrated reverse and steering mechanisms at both ends of the module and are coupled to the gears on the roller in such a way that each gear and roller combination can change rotational direction individually or together, in turn this will allow rotational direction changes either side of the pool cleaner as a steering influence or when both simultaneously engaged a straight-line direction change will occur. Since the drivetrain module has its own integrated power and reversing mechanisms within the module itself it can be retrofitted on different embodiments of a pool cleaner, whether it be wheel driven, wider or narrower platforms etc.

While the arrangement can work with only one set of rollers it has shown to be advantageous when coupled to a $2^{nd}$ set of rollers placed at the opposed end of the unit. This $2^{nd}$ set of rollers is similarly split in the middle. To provide drive to this second set of rollers an endless track with formations on the inside will coincide with toothed pulleys that are coupled to the ends of the $1^{st}$ set of rollers as well as to the ends of the $2^{nd}$ set of rollers. While it's possible to provide input to this 2nd set also by means of a gearing mechanism it is preferable to have a track as the variable contact with surfaces such as step edges etc. will enable the unit to have traction at all times.

The preferred arrangement of track and pulley is such that the diameter of track when positioned on pulley is slightly smaller than the roller diameter, for this reason normally the track will not be in contact with pool surfaces except when transitioning over corners edges etc. The benefit of this is that there are no frictional forces encountered to push track off pulley and minimal wear on track when either side of the unit reverse direction to create a steering effect. For similar reasons the tracks can be very supple with only side pulley flanges to keep it in place. The larger diameter rollers being wider than the tracks will provide more traction for the cleaner and wear will be significantly less being spread over a wider area. When the unit transitions over sharp edges the tracks will provide drive between the rollers so the unit does not bog down.

The roller and circumferential gear assembly being a separate module from the drive module can flex away from the drive module in such a way that should debris get into the gear arrangement between rollers and drive module the 2 modules can flex independently to vary the mesh between the gears for debris to clear.

The arrangement described herein has the benefit that it provides a modular option that has less power loss due to frictional forces or resistance than conventional systems, wear on track is minimalized and part count significantly less.

In the preferred embodiment the rollers can be covered with bristles to create a brushing or scrubbing effect everytime the cleaner steers, the outer ends of the roller that engages with the track pulley may have a harder material to determine the operating height of the unit as well as preventing the tracks from coming into contact with pool surfaces, while the area in-between may be covered with a soft bristle like material that may be slightly larger than the roller diameter. When in contact with pool surfaces the bristles will just flex out of the way due to the harder outside end being the contact area.

In another embodiment the 2nd set of coupled drive pulleys may have a different diameter to cause a frictional effect as it will rotate at a different rate than the main drive roller thus drag will occur on this roller to enable a full-time frictional force. It speaks for itself that in such instance the material on this roller has to be more resilient due to the fulltime frictional nature of the design.

For changing direction of output gears within the preferred power module an arrangement of worm and worm gears provide forward and reverse of direction, forward and reverse direction changes can occur on either shaft independently or together. Each output gear is coupled by a means to a pulley or track to in turn create a steering or reversing action.

Within the power module a turbine will provide input to a worm type gear, the worm in turn will provide input to an output gear by means of an oscillating assembly consisting of 2 worm gears (also known as worm wheels) where only one of the worm gears at any time will be engaged with the worm, by alternating engagement of the 2 worm gears with the worm, direction changes will occur on the output gear. Because of the screw like pattern of the worm the engagement and disengagement of a gear to a rotating worm is seamless and therefore significantly more suitable as a means to engage and disengage stationary gears to a rotating gear than other types of gears.

In the preferred embodiment the 2 worm gears within the oscillatable assembly are at all times connected to a third output gear in such a way that at any one time when any one of the worm gears will be engaged or disengage with the worm both stay meshed with the $3^{rd}$ gear, in such instance each of the worm gears will at some stage when one engaged and the other disengaged have a similar function as an idler gear. The $3^{rd}$ gear is in a fixed axial position in relation to the body of the unit in that it forms a stationary pivot point for the oscillatable gear carrying assembly, in turn the gear carrying assembly together with the 2 worm gears, while staying meshed with the $3^{rd}$ output gear, will be rotated around the center axis of the $3^{rd}$ gear to a position where either of the 2 worm gears alternatively make contact with the worm to change rotational direction. This pivotable carrier design has the benefit that the $3^{rd}$ output gear doesn't toggle or swivel away from the axial position with the engage and disengagement function as it forms the center position for rotation of the oscillatable assembly. The gear carrying assembly consists of 2 ends, both of which act as a mounting system for the 2 worm gears while allowing them to rotate freely around the $3^{rd}$ gear. The one end of the assembly will incorporate stops that will coincide with a fixed formation on the cleaner body to prevent the worm gear from meshing too tight with the worm while the other end will incorporate cam followers that will engage with a cam at predetermined intervals thereby to create a steering and reversing effect.

Due to the rotational relationship between the worm gears, the $3^{rd}$ gear and the worm, when under operation any force or friction is applied to the $3^{rd}$ output gear or dependent gears, during the engagement process, when first or initial contact is made between worm and worm gear, the tendency of the worm gear together with the oscillatable carrier assembly will be to rotate swiftly towards the fully engaged position with the worm. This has the benefit that the engagement of worm gear with the worm will be very swift in nature. In practice it has been found that the resistance between rollers and contact surfaces is sufficient force to allow this engagement to have a swift toggle effect. This feature further minimizes wear on the gears typically present with slow engagement and consequent grinding effect on gears.

For change of direction a centrally positioned cam will cooperate with the cam followers on the oscillatable worm gear assembly as to move the assembly between a first position where the $1^{st}$ worm gear will engage with the worm and a second position where the $1^{st}$ worm gear will disengage and the $2^{nd}$ worm gear engage with the worm and vice versa. For a very brief moment both worm gears will be disengaged from the worm while one of the gears is in the engagement process and the other disengaged. The design of the cam profile is such that it will allow the gear carrier assembly to toggle freely to the engaged position as soon initial contact takes place between worm and worm gear. Since the worm gear will during operation be biased towards full engagement to the worm external stops on the gear carrier assembly will prevent gears from meshing too tight, these external stops are preferable to existing configurations that utilize the operating cam to function as a holding position for the engaged phase and consequently higher forces acting on cam. In addition to the benefit of creating a very swift engagement the forces on cam is very low as there is no contact between cam and follower when gears engaged, only during the brief engage and disengagement process.

While variations of the mechanism exist, for the preferred device a worm with both left and right-hand directional thread is positioned in such a way as to allow an oscillatable gear carrying assembly with 2 integrated worm gears to engage and disengage alternatively with the worm. Engagement of each gear will be to each one of the directional threads therefore have a different direction of rotation than the other gear for in turn a directional change to the cleaner.

For the preferred device 2 worms and 2 gear carrying oscillatable assemblies are utilized, a single centrally positioned cam will intermittently exert a bias to either or both assemblies in such a fashion that each side can be reversed independently of the other by means of a programmed timing factor. For the preferred embodiment a brief steering effect will be followed by a change of direction.

While various patterns can be utilized, for this device a single cam consisting of 4 different profiles will enable 4 steering and reversing actions. The preferred path would be to simulate a broom sweep pattern where most of the reverse and forward direction changes will follow a path slightly offset from one another with the exception of one direction change that should be sufficient to allow cleaner to move to another area of the pool. Typically this direction change would be higher than 5 degree but less than 360 degree.

It follows then that various combinations can be utilized for the configuration, the benefit of this particular configuration is the very compact seamless engage and disengagement between worm and worm gear and in particular the configuration of the rotational relationship between the worm and worm gear for allowing the quick toggle like engagement to the worm without need of toggling devices such as magnets or springs.

The arrangement of rollers integrated with a large flexible drive gear as a means to provide drive to the tracks is very robust and low wear factor with low part count vs other mechanisms utilizing a $3^{rd}$ drive pulley within endless track.

Furthermore as shown in my U.S. Pat. No. 7,464,429 and US 20040211450 a removable lid for access to turbine in case of debris removal may be utilized. This in conjunction with a turbine in a vortex situated away from the line of flow and debris as in my patent US 2012/0060307 A1 allows for a very compact and efficient pool cleaner with large debris digestion capability, minimal part count and very good reliability. The vortex configured turbine protects the drivetrain due to the variable torque characteristics of the design, should blockages occur anywhere in the drivetrain therefore no damage will occur to components.

BRIEF DESCRIPTION OF THE DRAWINGS

FIG. 6, 7, 8, 9 depicts variations of worm reversing mechanisms.

FIGS. 10 to 10.3 depicts a variant of a biasing mechanism in conjunction with normal type gears FIG. 11 depicts a preferred pattern for cleaning

DETAILED DESCRIPTION OF THE DRAWINGS

Figure 1:
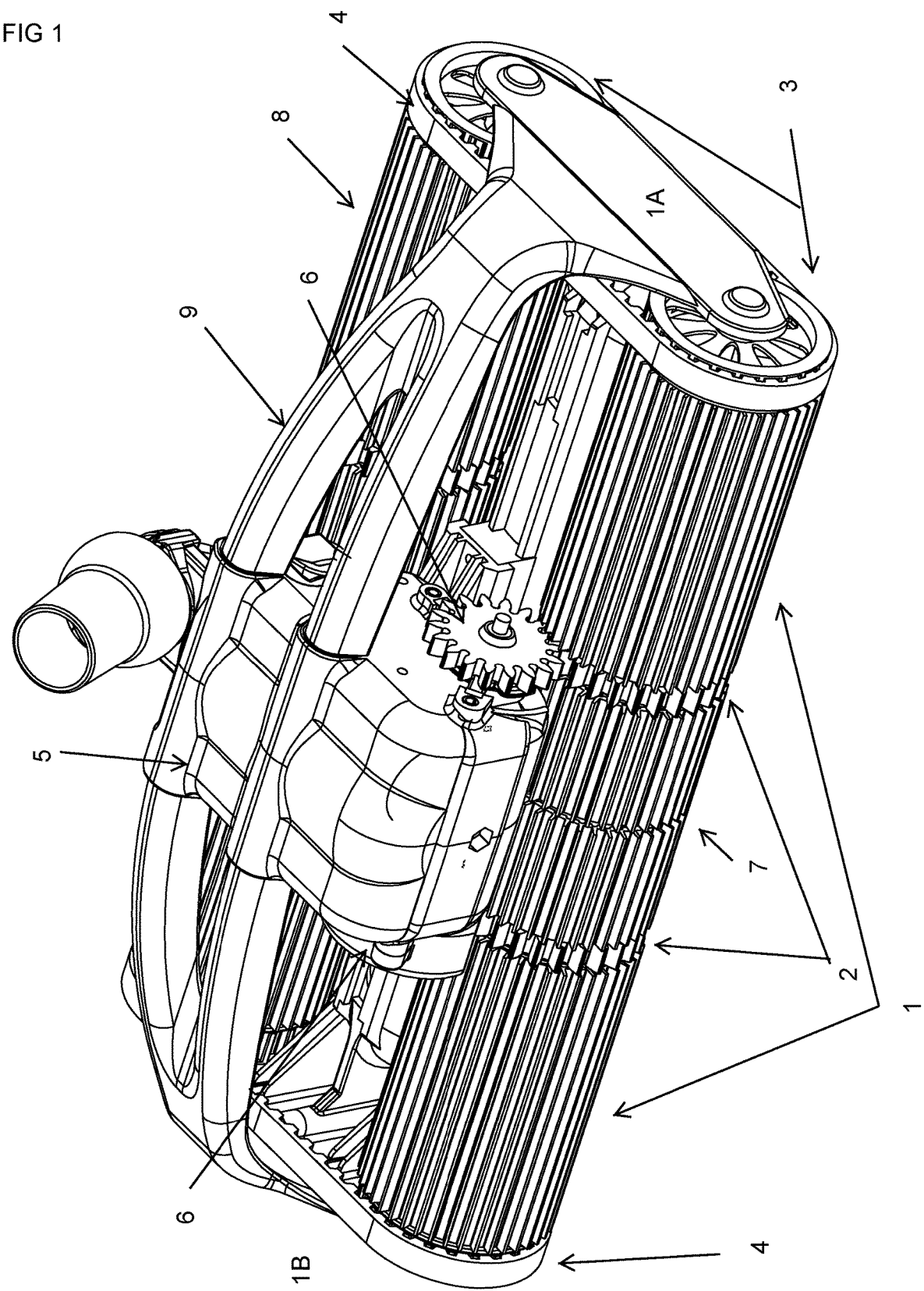
FIG. 1 depicts an isometric view showing the drive module and roller configuration.

In FIG. 1 the turbine driven power module 5 provides drive output through two gears 6 situated at a left side 1A and right side 1B of the power module, direction of rotation of gears 6 on each side can independently or together be reversed from a clockwise to anticlockwise direction and vice versa. A Gear 6 on each side engage with a gear 2 in line with each roller, gear 2 is coupled to rollers 1 which in turn is coupled to track pulleys 3, track 4 provide drive between rollers 1 and rollers 8 positioned opposed rollers 1. Rollers 1 and 8 is split in the middle 7, so each side of rollers and track combination can individually be driven by the power module 5 without interference from one another. Depending on the direction of rotation of gear 6 on each side therefore the cleaner can steer to either side or change direction in a straight line.

The relationship between gear 6 and gear 2 is such that the tolerance of the meshing between the gears 6 and 2 can be varied, in the preferred embodiment the design had been optimized to allow sufficient flex between the drive module 5 and chassis with rollers 1 and 8 so most type of debris will be able to pass between gears 2 and 6 when in operation. The rotational direction between gear 2 and gear 6 is also such that towards the direction of movement of the cleaner debris will be pushed away from the gears instead of drawn in.

For the preferred embodiment the arms 9 FIG. 1 is shaped like a bow to allow flexing between the upper and lower segments while making the cleaner sturdy under normal operation. Gear 2 can also be molded from a flexible material.

When gears 6 on both sides of power module 5 rotate in the same direction the pool cleaner will be driven to move either forward, or reverse in a straight line depending on the direction of rotation. When gear 6 on only one end of the power module 5 is reversed the track 4 and roller combination on the affected side will also reverse rotation, in turn this will allow the cleaner to steer due to one side going forward and one reversing. This procedure will repeat itself on either side at predetermined intervals determined by the centrally positioned cam 15 FIG. 2. The preferred cam 15 design is such that one of the gears 6 will reverse rotation slightly before or after the opposed gear 6 so a steering effect occurs before or after a reverse or forward directional change.

Figure 2:
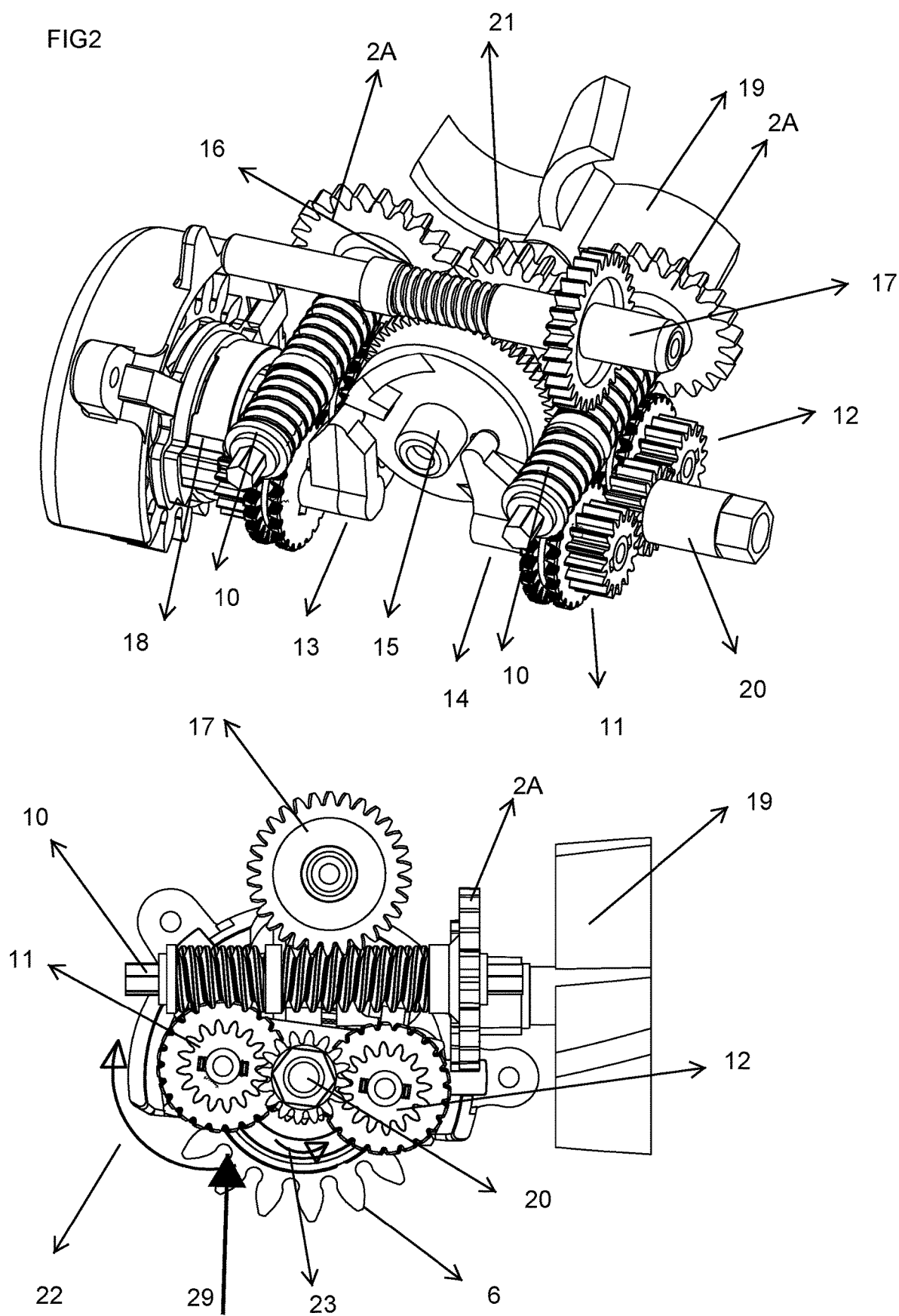
FIG. 2 depicts a side on and isometric view of the power module with outer cover removed, to show the drive unit and relationship between the various parts FIG. 3 to FIG. 3c depicts a side on and isometric view gear carrier oscillatable assembly with integrated cam follower and stops including a series of processes for engage and disengagement
Figure 3:
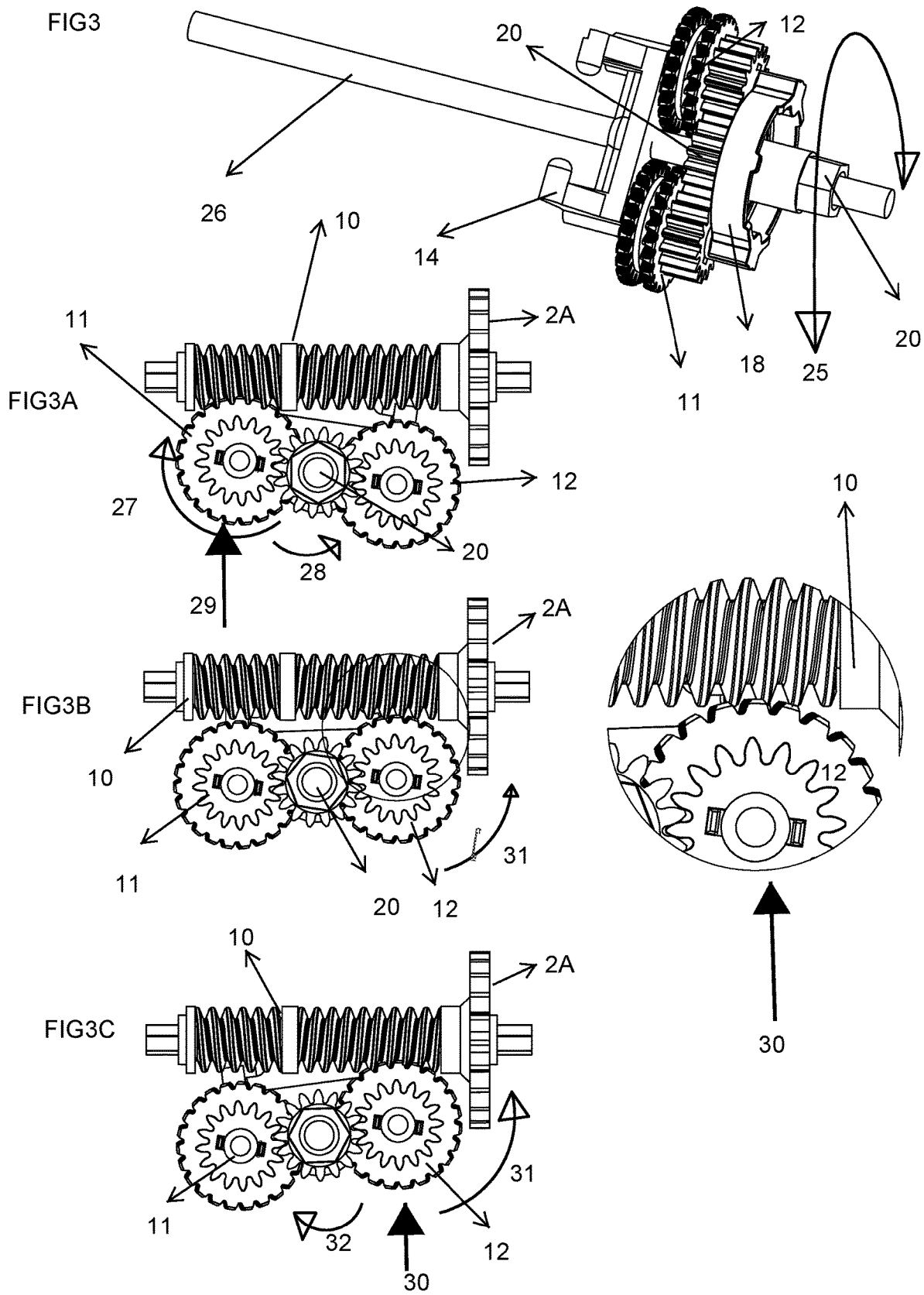

FIG. 2 depicts the drive module 5 with cover removed, turbine 19 will rotate when suction or pressure applied, a gear 21 coupled to turbine 19 engages with a spur gear 2A that forms an integrated part of worm 10, this in turn will cause worm 10 to rotate. Worm has opposed directional threads, as shown in FIG. 2 and FIG. 3. Gears 11 and 12 is a single gear with two integrated types of teeth profiles, one set to mesh with the worm 10 and another profile to mesh with a third gear 20. The thread pattern on worm gear 11 and 12 that engages the worm has opposed teeth profiles to mate with the worm's dual opposed thread.

In FIG. 2, the two worms 10 will provide input to the output gears 6 by means of alternative engagement with a first worm gear 11 and a second worm gear 12 in two gear carrying assemblies to provide steering or reversing functions at both sides of the cleaner. Worm gear 11 is engaged with worm 10 and will rotate in direction shown by arrows 22, a third gear 20 will therefore rotate in the opposite direction as shown by arrows 23. The gear carrying assembly FIG. 3 is designed so at least one of the worm gears 11 or 12 will be engaged with the worm 10 while the other is disengaged, for a brief moment however when engage and or disengagement takes place both worm gears 11 and 12 will be disengaged from the worm 10. Worm gear 12 direction is not applicable in FIG. 2 as during this phase it will function as an idler gear.

In FIG. 3 one of the gear carrying assemblies is depicted in greater detail, it consists of a first worm gear 11 and a second worm gear 12, cam follower 14 and end stop cap 18. The assembly is held together by 2 internal shafts (not shown) between cam follower 14 and stop cap 18 that also function as the axles for worm gears 11 and 12. Cam follower 14 has a centrally positioned hole to coincide with the fixed axle 26 as a means to allow rotation of the complete assembly on the shaft 26. The complete gear carrying assembly therefore will be able to rotate freely around the axle 26 and a third output gear 20 as shown by the arrow 25 in FIG. 3. In turn output gear 20 can also rotate freely on the shaft 26 in terms it receives input from the two worm gears 11 and 12.

Figure 4:
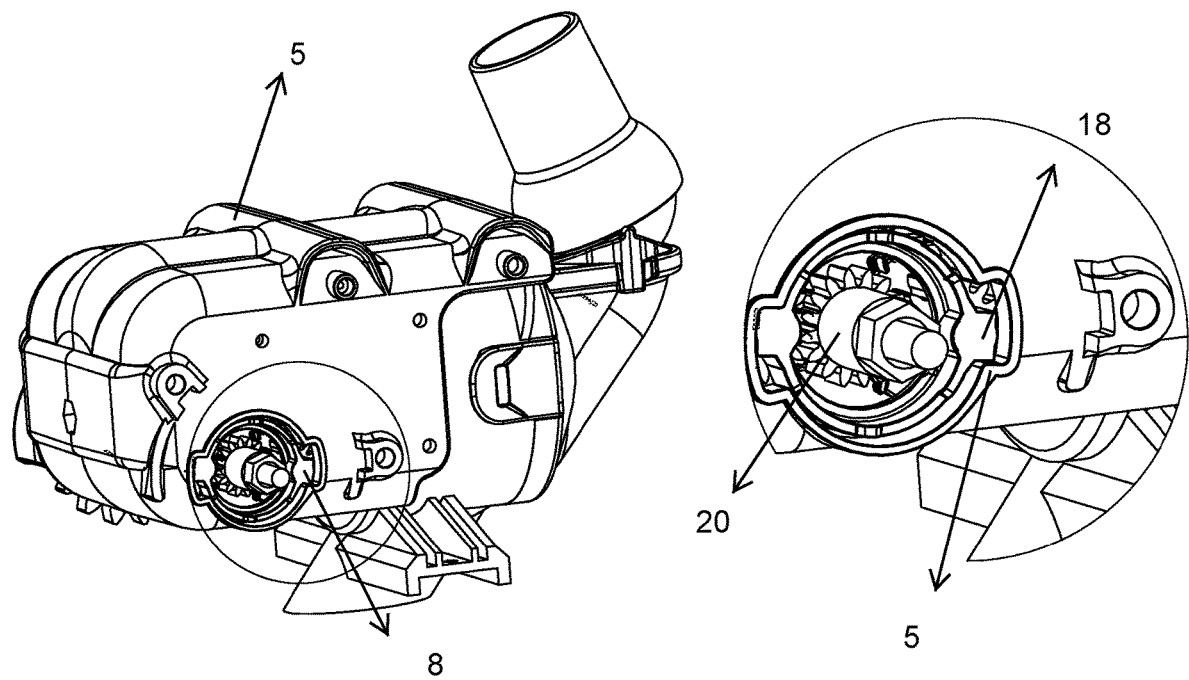
FIG. 4 depicts a close up view of the oscillatable gear carrying assembly end stop cap

As depicted in FIG. 3A when worm gear 11 is engaged with worm 10 and worm gear 12 disengaged, rotation of gear 11 will be as depicted by arrows 27 and in turn gear 20 as by arrows 28. Due to the rotational relationship as shown by arrows 27 and 28, between the worm 10, worm gear 11 and 12, and gear 20, as soon as either worm gear 11 or 12 make initial contact with worm 10 as shown in greater detail in FIG. 3B the mating worm gear will due to frictional forces of the drivetrain on gear 20 be biased to a swift fully engaged position with the worm 10. To illustrate this arrow 31 in FIG. 3B indicate the direction the gear carrier assembly with worm gears will rotate should gear 20 have a slight amount of friction applied to it when initial contact made with worm 10. In practice it has been found that friction from the drivetrain is sufficient to create sufficient load on gear 20 to enable the carrier assembly with worm gears to swiftly toggle to the fully engaged position with worm 10 as shown in FIG. 3C to reverse rotation as shown by arrows 31 and 32. In FIG. 3C now worm gear 11 will have the function of an idler gear. Arrows 29 and 30 indicate the direction of force on the gear carrying assembly when worm gears 11 or 12 are engaged. Apart from the rotational relationship there are no devices needed to keep the worm-gears 11 or 12 engaged to worm 10. Due to the positive biased engagement the end cap stops 18, shown in greater detail in FIG. 4, will prevent worm gears 11 or 12 from meshing too tight with worm 10.

The engage and disengagement of worm gears 11 and 12 are by means of actuating mechanism comprising a cam 15 FIG. 2 providing input to cam followers 13 and 14 on 2 gear carrying assemblies. Cam 15 rotates from input provided by worm 16 with integrated worm gear 17 in turn engaged with worm 10. At predetermined intervals cam followers 13 and 14 will be biased by the cam profile to either engage or disengage worm gear 11 or 12 with worm 10 depending on the position of the cam followers 13 and 14 in relation to the cam 15. By engaging and disengaging the worm gears 11 and 12 either side of the unit can be made to steer or change direction, the duration of such steering and or direction change will be determined by the specific cam design. Cam 15 will only be in contact with follower 13 and 14 during the engage or disengagement phase, as soon the gear carrying assembly toggled to the fully engaged position due to the biasing influence determined by the rotational relationship between the worm gears 11 and 12, worm 10 and gear 20 there will be no further surface contact between cam 15 and cam follower 13 or 14. Due to the positive biased engagement from the rotational relationship between the gears 11, 12 and worm 10 around gear 20 external stops 18 FIG. 4 within the gear carrying assembly will prevent too tight mesh between gear 11, 12 and worm 10.

Figure 5:
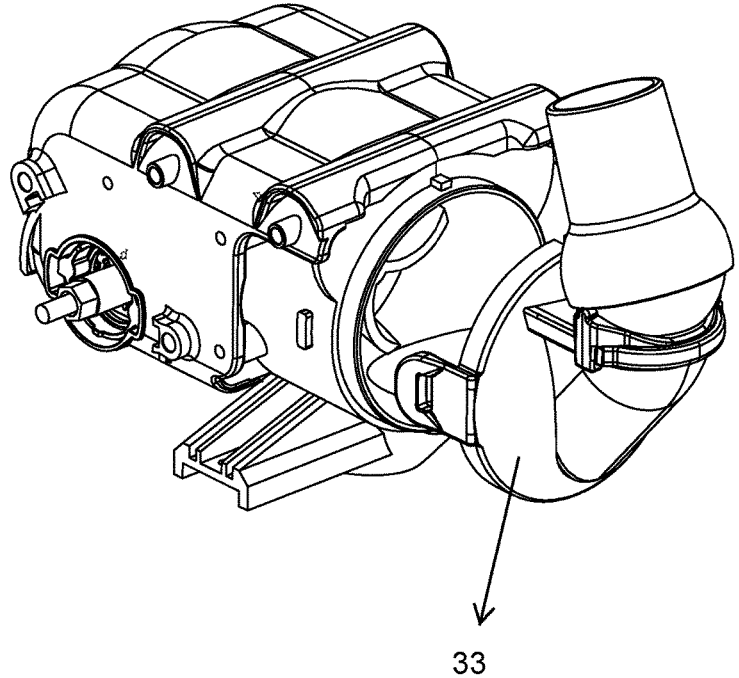
FIG. 5 depicts a Removable back plate

In FIG. 5 the removable back plate 33 is shown for ease of removal for debris.

In FIG. 6 a variation of the relationship of a single thread worm 6A to worm gears 11 and 12 are shown, in this embodiment a first worm gear 11 and a second worm gear 12 is positioned at opposite sides of a single directional thread worm, integrated in worm 6A is a spur gear 6B. By using the biasing mechanisms described an oscillatable assembly 37 can be rotated in direction as depicted by arrows 36. When worm gear 11 engages the single tread worm 6A it will rotate in direction as shown by arrows 34 when worm rotates in direction of arrows 35. When the cam actuating mechanism rotate the assembly 37 to disengage worm gear 11 and engage worm gear 12, the rotational direction will be reversed as shown by arrows 38. Not shown here is the addition of a third meshed gear to function as a biasing mechanism and output gear similar to gear 20 to allow the positive engagement toggle effect to the worm.

FIG. 7 depicts an alternative version where the worm gears 11 and 12 stay in a fixed position while a single thread input worm 6A is shifted between the two worm gears 11 and 12 in direction of arrows 39. The arrows 34 and 38 depict the direction of rotation when worm gears 11 or 12 engage the worm.

Figure 8:
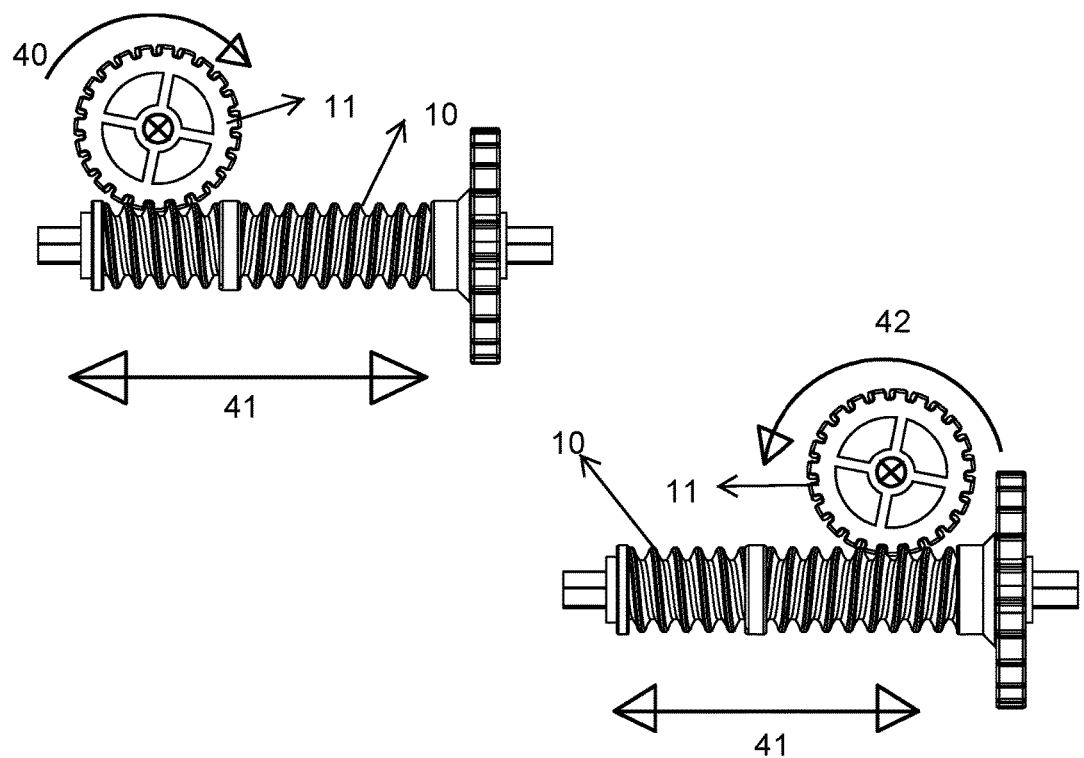

FIG. 8 depicts a version where a dual thread worm similar to worm 10 can slide laterally in direction of arrows 41 and only a single worm gear 11 will alternatively engage with either thread direction to reverse rotation as shown by arrows 40 and 42.

Figure 9:
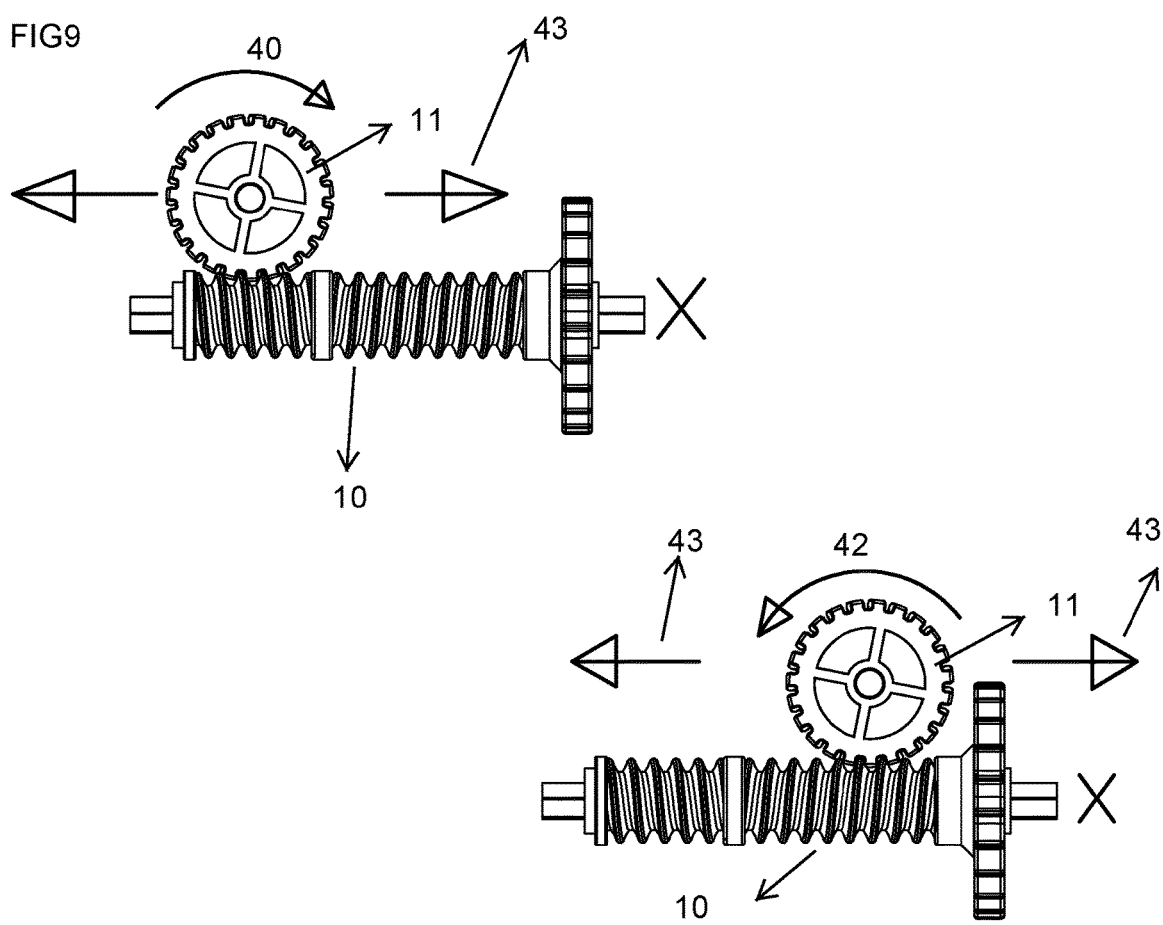

FIG. 9 depicts yet another variant where in this case the input worm 10 stays in position while a single worm gear 11 can shift in a linear fashion between two opposed threads as shown by arrows 43. Worm gear 11 will now change rotational direction as depicted by arrows 40 and 42.

In FIG. 10 a variation of the gear carrying and toggle effect biasing mechanism is shown with a normal gear type such as spur or helical. A first Gear 48 is permanently engaged with a second gear 49, either gear 48 or 49 can be the driven input gear. Gear 48 and 49 is axially mounted in a fixed position so they can rotate but not pivot away from their respective positions.

An oscillatable gear carrying assembly 53 consist of a third gear 50 and a fourth gear 51 permanently engaged with a fifth gear 52. Fifth gear 52 is axially mounted to a fixed position and also forms the central pivot and mounting point for the gear carrying assembly 53 so that the gear carrying assembly 53 can together with gear 50 and 51 rotate around the axis of the fifth gear 52. Gear 52 also functions as a non oscillatable output gear for the rest of the drivetrain.

During operation and as shown in FIGS. 10 to 10.3 the rotation of gear 48 and 49 will always be in direction of arrows D and E. Oscillatable assembly 53 can rotate freely around axis of gear 52 in directions as shown by arrows F A cam mechanism for actuating assembly 53 to rotate around the center pivot point of axis of gear 53 is not shown but is similar as described for the other embodiments. In FIG. 10 the third gear 50 and fourth gear 51 is stationary as they are not engaged with rotating first gear 48 or second gear 49. During operation as soon a cam mechanism (not shown) bias the gear carrying assembly 53 to the initial contact position as shown in FIG. 10.1 gear 51 will engage with driven input gear 49, as soon initial contact is made as seen in close up view FIG. 10.1 A, the rotational relationship between input gears 48 and 49 to gears 50 and 51 within the oscillatable assembly around gear 52 will create a swift toggle effect in direction of arrows G to a fully engaged position as shown in FIG. 10.2 and close up view 10.2 B. As in the other embodiments this toggle effect is achieved due to friction from the drivetrain on gear 52. Gear 52 will now rotate in direction H.

To illustrate the procedure for the toggle effect mechanism based on gear rotational relationship in FIG. 10.3 C a close up of the third gear 50 relationship with fifth gear 52 shows how if gear 52 would be prevented from turning, when gear 50 rotates in direction of arrows J the assembly 53 will together with the gear 50 be biased upwards to a direction indicated by arrow K which is towards the first input gear 48. Gear 52 will now rotate in direction of arrows L. Under normal condition gear 52 will not be prevented from turning but in tests it has shown that the friction of the drivetrain on gear 52 is sufficient to display a behavior similar to as if the gear 52 is held stationary in terms of creating a swift toggle effect in the direction indicated by arrows K. For the same reason the continuous friction on gear 52 from the drivetrain will keep either gear 50 or 51 engaged to either gear 48 or 49 respectively. In FIG. 10.1 where gear 51 is engaged to gear 49 the relationship is the same to create the toggle effect and positive engagement without need for holding the gear engaged by any other means. As in the other embodiments due to the positive engagement stops (not shown) within the gear carrying assembly will prevent gear mesh between gear 48 and 50 and 49 with 51 from being too tight.

FIG. 11 illustrates the preferred cleaning path simulating a "broom-sweep" pattern that has been found to be very efficient to clean a pool of any size, as can be seen the path indicated by arrows 45 depicts a slight steering function with every direction change, this will allow the cleaner 44 to move in slightly off-set paths to cover a mostly square area, a fourth larger turn 46 will steer cleaner to a different area of pool indicated by arrow 47 where the pattern will repeat itself.

The invention claimed is:

1. In an automatic pool cleaner comprising a first gear and a second gear, a mechanism for changing between the first gear and the second gear, the mechanism comprising:
   a first oscillatable gear carrying assembly moveable between a first position wherein the first gear is engaged to a worm and a second position wherein the second gear is engaged to the same worm;
   an actuating arrangement for selecting one of the first and second positions by initiating movement of the oscillatable gear carrying assembly to urge the oscillatable gear carrying assembly towards a selected one of the first and second positions; the first gear and the second gear being mounted on the first oscillitable gear carrying assembly and when the first gear is engaged, the cleaner is driven to move in a first direction and when the second gear is engaged the cleaner is driven in a second direction; and wherein the first gear and second gear within the first oscillatable gear carrying assembly are always engaged to one another by means of a third gear, the third gear being mounted in a fixed axially oriented position to form a pivot point for the first oscillatable gear carrying assembly when rotated to the first or second positions to engage either the first or second gears with the worm, the relationship of rotation between the worm and first and second gears to be determined so that when under operation torque or friction applied to the third gear either the first or second gear will be biased to a fully engaged position directly with the worm after initial direct contact is made with the worm;
   wherein a second oscillatable gear carrying assembly is located in the same axial position as the first oscillatable gear carrying assembly so that one side of the cleaner may reverse in relation to an opposite side of the cleaner when the first oscillatable gear carrying assembly is actuated towards a different position of rotation than the second oscillatable gear carrying assembly.

2. The mechanism as claimed in claim 1, wherein the worm has a left hand directional thread and a right hand directional thread, such that, when the first gear engages the left hand directional thread on the worm, the cleaner is driven to move in a first direction, and, when the first gear disengages the left hand directional thread and the second gear engages the right hand directional thread the cleaner is driven to move in a second direction.

3. The mechanism as claimed in claim 1 wherein both the first and second oscillatable gear carrying assemblies are actuated to any of said first and second positions by a single cam device to form a fixed timed relationship between the first and second oscillatable gear carrying assemblies in a manner where the cleaner will always follow a predetermined path.

4. The mechanism as claimed in claim 3 wherein the cam will incorporate a predetermined pattern with at least one reverse direction and at least one steering direction, wherein a steering action will immediately be followed by a reversing of direction of the cleaner.

5. The mechanism as claimed in claim 1 wherein the first oscillatable gear carrying assembly will provide input to the one side of the cleaner and the second oscillatable gear carrying assembly will provide input to the opposite side of the cleaner, wherein a fourth gear in either of the first or second oscillatable gear carrying assemblies will be meshed with a fifth gear, wherein the fifth gear is mounted circumferentially to a first set of drive wheels, rollers or pulleys at both the one and opposite sides of the cleaner, wherein the pulleys have at least one tooth, wherein a track with at least one inside formation will provide drive to a second set of drive wheels, rollers or pulleys positioned opposed the first set of rollers, wheels or drive pulleys.

6. The mechanism as claimed in claim 5, where the fifth gear mounted circumferentially to the first set of drive wheels, rollers or pulleys is molded from a flexible material.

7. A device for cleaning a submerged surface in a fluid comprising a drive mechanism, wherein the drive mechanism is connected to a fluid inlet and outlet, wherein movement of fluid through the fluid inlet to the fluid outlet will allow the drive mechanism to provide rotational input to a worm, wherein an oscillatable gear carrying assembly will include a first and a second gear, wherein the first and second gear will be permanently meshed with a third gear where the third gear is mounted on a fixed axial position in relationship to a cleaner body, wherein the first and second gear together with the oscillatable gear carrying assembly will rotate around the fixed axial position of the third gear, wherein a means to pivot the oscillatable gear carrying assembly around the axially fixed positon of the third gear axis will allow the first and second gear to alternatively directly engage and disengage with the worm, wherein the third gear forms a fixed axially orientated position for output drive to a remainder of a drivetrain, wherein the device will move in one direction when the first gear is engaged to the worm while the second gear is disengaged and an opposed direction when the second gear is engaged to the worm while the first gear is disengaged from the worm; wherein the orientation of rotation of the gears is such that when friction or load applied to the third gear carrying assembly will, upon initial contact with the worm, bias a corresponding one of the first or second gears to pivot towards a fully engaged position with the worm; and wherein the worm will have a left hand type thread and a right hand type thread, such that the first gear will engage to left hand type thread to rotate in an opposed direction to the second gear when the second gear engages to the right hand type thread.

8. The mechanism as claimed in claim 1 wherein a cleaning path will simulate parallel cleaning paths whereby a short turn will precede a reverse of direction change; and
    wherein at least one of the turns will be of longer duration to allow a turn of larger degree of no more than 360 degree to precede a direction change to allow the cleaner to proceed to a different area within the pool.

9. In an automatic pool cleaner comprising a first gear and a second gear, a mechanism for changing between the first gear and the second gear, the mechanism comprising:
    an oscillatable gear carrying assembly moveable between a first position wherein the first gear is directly engaged to a worm and a second position wherein the second gear is directly engaged to the same worm;
    an actuating arrangement for selecting one of the positions by initiating movement of the oscillatable gear carrying assembly to urge the oscillatable gear carrying assembly towards the selected one of the positions; the first gear and the second gear being mounted on the oscillatable gear carrying assembly and when the first gear is engaged, the cleaner is driven to move in a first direction and when the second gear is engaged the cleaner is driven in a second direction; and
    wherein the worm has a left hand directional thread and a right hand directional thread such that, when the first gear engages the left hand directional thread on the worm, the cleaner is driven to move in a first direction, and, when the first gear disengages the left hand direction thread and the second gear engages the right hand directional thread, the cleaner is driven to move in a second direction.

* * * * *